US012792399B2

(12) United States Patent
Ipsen et al.

(10) Patent No.: US 12,792,399 B2
(45) Date of Patent: Nov. 10, 2026

(54) RECOURSES FOR RESOLVING CONSTRAINED RESOURCE ALLOCATION PROBLEMS

(71) Applicant: JPMorgan Chase Bank, N.A., New York, NY (US)

(72) Inventors: Anton Ipsen, Manhattan, NY (US); Rui Manuel Ramos Teixeira Da Silva, London (GB); Michael Cashmore, Stirlingshire (GB); Kirsty Fielding, Lancashire (GB); Nicolas Marchesotti, London (GB); Daniele Magazzeni, London (GB); Manuela Veloso, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 439 days.

(21) Appl. No.: 18/234,719

(22) Filed: Aug. 16, 2023

(65) Prior Publication Data

US 2025/0060997 A1 Feb. 20, 2025

(51) Int. Cl.

*G06F 9/50* (2006.01)
*G06F 9/48* (2006.01)
*G06Q 10/06* (2023.01)

(52) U.S. Cl.

CPC .............. *G06F 9/5005* (2013.01); *G06F 9/48* (2013.01); *G06F 9/4843* (2013.01); *G06F 9/4881* (2013.01); *G06F 9/50* (2013.01); *G06Q 10/06* (2013.01)

(58) Field of Classification Search

CPC . G06F 9/50; G06F 9/5005; G06F 9/48; G06F 9/4843; G06F 9/4881; G06Q 10/06

See application file for complete search history.

(56) References Cited

U.S. PATENT DOCUMENTS

| | | | | |
|---|---|---|---|---|
| 10,943,213 | B1 * | 3/2021 | Natarajan | G06Q 10/1093 |
| 2013/0346587 | A1 * | 12/2013 | Barkett | G06Q 50/01 709/224 |
| 2014/0289412 | A1 * | 9/2014 | Doddavula | G06F 9/5072 709/226 |
| 2016/0191345 | A1 * | 6/2016 | Despotovic | G06F 16/951 709/226 |
| 2018/0039526 | A1 * | 2/2018 | Mulla | G06Q 10/06312 |
| 2018/0278493 | A1 * | 9/2018 | Guim Bernat | H04L 49/25 |
| 2019/0109768 | A1 * | 4/2019 | Senarath | H04L 41/5006 |

(Continued)

*Primary Examiner* — Charles M Swift

(74) *Attorney, Agent, or Firm* — GREENBLUM & BERNSTEIN, P.L.C.

(57) ABSTRACT

A method and a system for using artificial intelligence (AI) techniques to generate actionable recourses for resolving constrained resource allocation problems that would otherwise be infeasible are provided. The method includes: receiving, from a user, a request for a resource allocation that includes information that relates to resources to be allocated; receiving information that relates to mandatory constraints with respect to the request; determining that an infeasibility exists with respect to fulfilling the request in a manner that satisfies each of the constraints, by applying an AI algorithm that uses a mixed-integer optimization technique for identifying at least one constraint that is impossible to satisfy; and generating an actionable recourse for facilitating a fulfillment of the request in a manner that overcomes the infeasibility.

15 Claims, 4 Drawing Sheets

(56) References Cited

U.S. PATENT DOCUMENTS

| | | | | |
|---|---|---|---|---|
| 2023/0101023 | A1* | 3/2023 | Jin | G06Q 10/087<br>705/7.31 |
| 2024/0073154 | A1* | 2/2024 | Dintenfass | G06Q 30/0201 |
| 2024/0144185 | A1* | 5/2024 | Lioumbis | G06Q 10/1093 |

* cited by examiner

RECOURSES FOR RESOLVING CONSTRAINED RESOURCE ALLOCATION PROBLEMS

CROSS-REFERENCE TO RELATED APPLICATIONS

This application is being filed concurrently on Aug. 16, 2023, with U.S. patent application Ser. No. 18/234,724, entitled "Method and System for Generating Explanations for Infeasible Constrained Resource Allocation Problems"; the contents of which are hereby incorporated by reference in its entirety.

BACKGROUND

1. Field of the Disclosure

This technology generally relates to methods and systems for using artificial intelligence techniques to generate actionable recourses for resolving constrained resource allocation problems that would otherwise be infeasible.

1. Background Information

A constrained resource allocation situation may arise in many contexts, such as, for example, personnel scheduling, shipping logistics, and real estate utilization. In such a constrained resource allocation situation, a user may specify business-related constraints that would create an infeasible problem. For instance, when dealing with shipping logistics where a business-related constraint on deliveries may be made, then a combination of constraints could make the problem infeasible.

However, such a combination of constraints may not be meaningful in the context of a user, as the constraints may be specified to be interpreted by an artificial intelligence (AI) model. In this situation, an explanation that indicates causes and/or reasons for the infeasibility of the problem is important, in order to facilitate a resolution of the problem. In this regard, a generation of an actionable recourse that provides a possible way to overcome the infeasibility of the problem and thereby facilitates a resource allocation that is both feasible and satisfactory is also important.

Accordingly, there is a need for a mechanism for using artificial intelligence techniques to generate actionable recourses for resolving constrained resource allocation problems that would otherwise be infeasible.

SUMMARY

The present disclosure, through one or more of its various aspects, embodiments, and/or specific features or sub-components, provides, inter alia, various systems, servers, devices, methods, media, programs, and platforms for using artificial intelligence techniques to generate actionable recourses for resolving constrained resource allocation problems that would otherwise be infeasible.

According to an aspect of the present disclosure, a method for responding to a request for a resource allocation is provided. The method is implemented by at least one processor. The method includes: receiving, by the at least one processor from a user, a request for a resource allocation that includes first information that relates to at least one resource to be allocated; receiving, by the at least one processor, a first input that includes second information that relates to at least one constraint that is mandatory with respect to the request; determining, by the at least one processor, that an infeasibility exists with respect to fulfilling the request in a manner that satisfies each of the at least one constraint; and generating, by the at least one processor, an actionable recourse for facilitating an fulfillment of the request in a manner that overcomes the infeasibility.

The determining that the infeasibility exists may include applying a first algorithm that uses at least one mixed-integer optimization technique for identifying at least one from among the at least one constraint that is impossible to satisfy.

The generating of the actionable recourse may include using a subject matter expertise (SME) knowledge database to translate the identified at least one from among the at least one constraint that is impossible to satisfy into at least one explanation that is usable for generating the actionable recourse.

The method may further include displaying, via a graphical user interface (GUI), a result of the generating of the actionable recourse.

The method may further include: displaying, via a GUI, a prompt that facilitates a reception of a second input that includes at least one adjustment to the second information included in the first input; determining, by the at least one processor based on the second input, whether the infeasibility has been overcome; when a determination is made that the infeasibility has been overcome, generating a response to the request, and displaying the response via the GUI; and when a determination is made that the infeasibility has not been overcome, generating a revised actionable recourse based on the determination that the infeasibility has not been overcome, and displaying the revised actionable recourse via the GUI.

The first input may further include third information that relates to at least one preference that is not mandatory.

The request for the resource allocation may relate to resources associated with shipping logistics, and the at least one constraint may include at least one requirement that relates to a delivery time.

Alternatively, the request for the resource allocation may relate to resources associated with real estate utilization, and the at least one constraint may include at least one number of available desks at a particular time.

As another alternative, the request for the resource allocation may relate to labor resources associated with a task, and the at least one constraint may include at least one number of qualified personnel that are required for staffing with respect to the task at a particular time.

According to another aspect of the present disclosure, a computing apparatus for responding to a request for a resource allocation is provided. The computing apparatus includes a processor; a memory; a display; and a communication interface coupled to each of the processor, the memory, and the display. The processor is configured to: receive, from a user via the communication interface, a request for a resource allocation that includes first information that relates to at least one resource to be allocated; receive, via the communication interface, a second input that includes second information that relates to at least one constraint that is mandatory; determine that an infeasibility exists with respect to fulfilling the request in a manner that satisfies each of the at least one constraint; and generate an actionable recourse for facilitating an fulfillment of the request in a manner that overcomes the infeasibility.

The processor may be further configured to apply a first algorithm that uses at least one mixed-integer optimization technique for identifying at least one from among the at least one constraint that is impossible to satisfy.

The processor may be further configured to generate the actionable recourse by using a subject matter expertise (SME) knowledge database to translate the identified at least one from among the at least one constraint that is impossible to satisfy into at least one explanation that is usable for generating the actionable recourse.

The processor may be further configured to cause the display to display a result of the generation of the actionable recourse via a graphical user interface (GUI).

The processor may be further configured to: cause the display to display, via a GUI, a prompt that facilitates receiving a second input that includes at least one adjustment to the second information included in the first input; determine, based on the second input, whether the infeasibility has been overcome; when a determination is made that the infeasibility has been overcome, generate a response to the request, and cause the display to display the response via the GUI; and when a determination is made that the infeasibility has not been overcome, generate a revised actionable recourse based on the determination that the infeasibility has not been overcome, and cause the display to display the revised actionable recourse via the GUI.

The first input may further include third information that relates to at least one preference that is not mandatory.

The request for the resource allocation may relate to resources associated with shipping logistics, and the at least one constraint may include at least one requirement that relates to a delivery time.

Alternatively, the request for the resource allocation may relate to resources associated with real estate utilization, and the at least one constraint may include at least one number of available desks at a particular time.

As another alternative, the request for the resource allocation may relate to labor resources associated with a task, and the at least one constraint may include at least one number of qualified personnel that are required for staffing with respect to the task at a particular time.

According to yet another aspect of the present disclosure, a non-transitory computer readable storage medium storing instructions for responding to a request for a resource allocation is provided. The storage medium includes executable code which, when executed by a processor, causes the processor to: receive, from a user, a request for a resource allocation that includes first information that relates to at least one resource to be allocated; receive a first input that includes second information that relates to at least one constraint that is mandatory with respect to the request; determine that an infeasibility exists with respect to fulfilling the request in a manner that satisfies each of the at least one constraint; and generate an actionable recourse for facilitating an fulfillment of the request in a manner that overcomes the infeasibility.

When executed by the processor, the executable code may further cause the processor to apply a first algorithm that uses at least one mixed-integer optimization technique for identifying at least one from among the at least one constraint that is impossible to satisfy.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
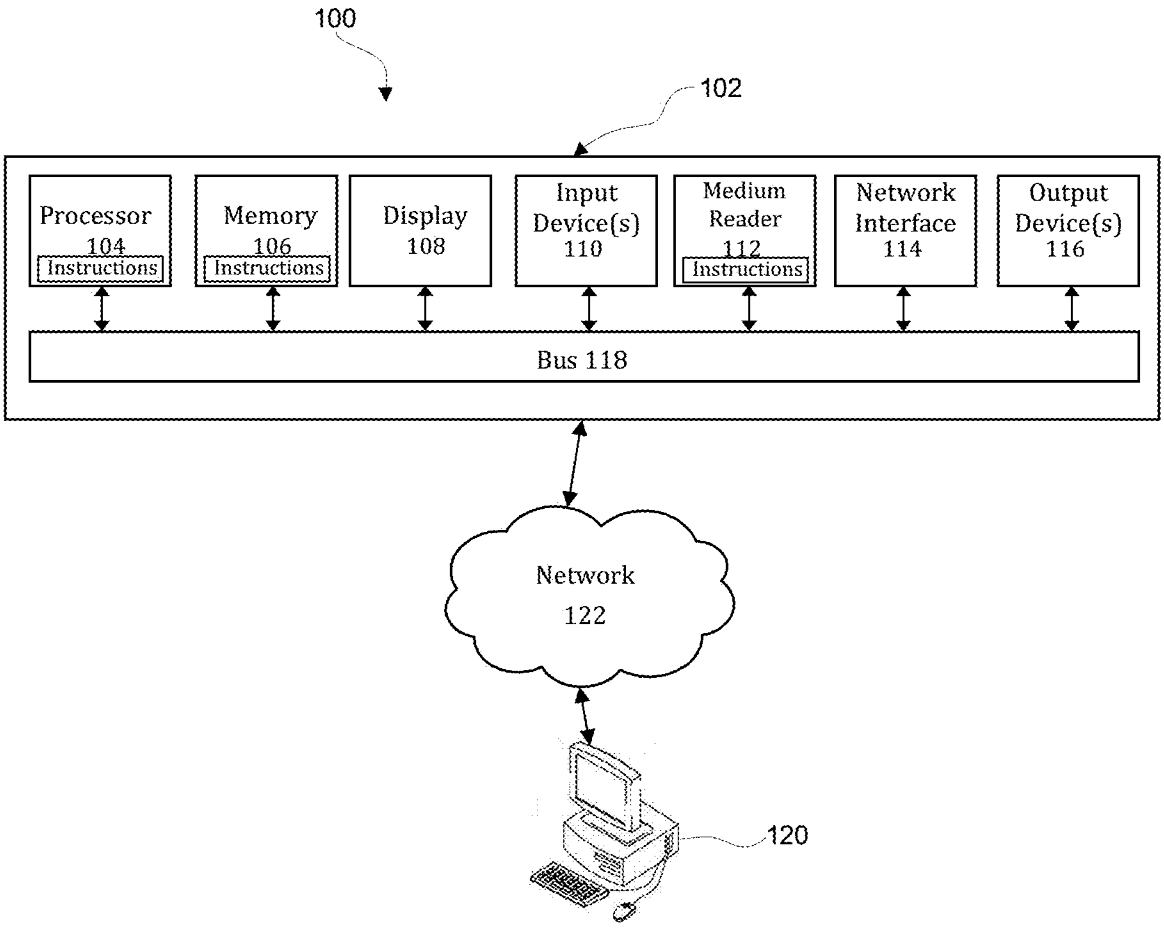
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, bluray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for using AI techniques to generate actionable recourses for resolving constrained resource allocation problems that would otherwise be infeasible.

Figure 2:
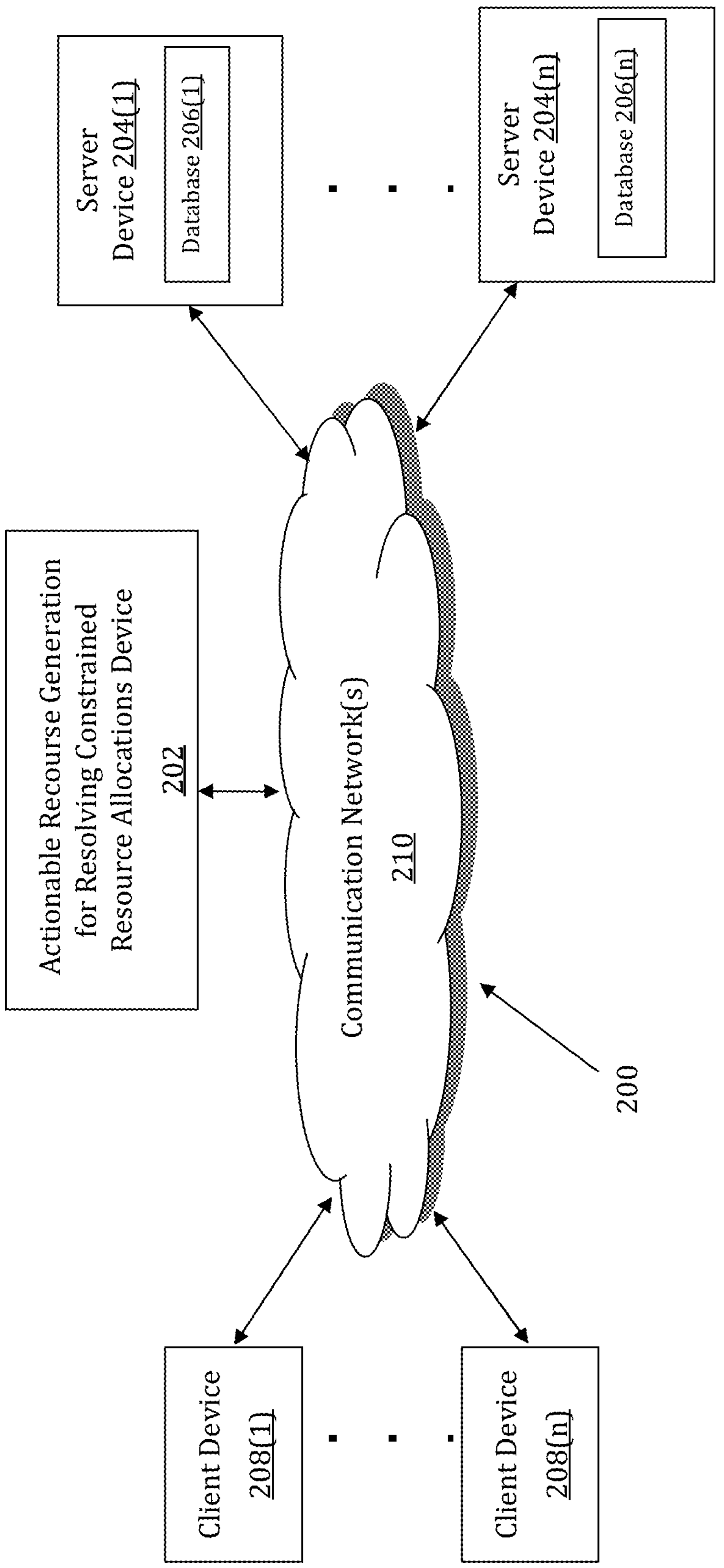
FIG. 2 illustrates an exemplary diagram of a network environment.

Referring to FIG. 2, a schematic of an exemplary network environment 200 for implementing a method for using AI techniques to generate actionable recourses for resolving constrained resource allocation problems that would otherwise be infeasible is illustrated. In an exemplary embodiment, the method is executable on any networked computer platform, such as, for example, a personal computer (PC).

The method for using AI techniques to generate actionable recourses for resolving constrained resource allocation problems that would otherwise be infeasible may be implemented by an Actionable Recourse Generation for Resolving Constrained Resource Allocations (ARGRCRA) device 202. The ARGRCRA device 202 may be the same or similar to the computer system 102 as described with respect to FIG. 1. The ARGRCRA device 202 may store one or more applications that can include executable instructions that, when executed by the ARGRCRA device 202, cause the ARGRCRA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ARGRCRA device 202 itself, may be located in virtual server(s) running in a cloud-based computing environment rather than being tied to one or more specific physical network computing devices. Also, the application(s) may be running in one or more virtual machines (VMs) executing on the ARGRCRA device 202. Additionally, in one or more embodiments of this technology, virtual machine(s) running on the ARGRCRA device 202 may be managed or supervised by a hypervisor.

In the network environment 200 of FIG. 2, the ARGRCRA device 202 is coupled to a plurality of server devices 204(1)-204(*n*) that hosts a plurality of databases 206(1)-206(*n*), and also to a plurality of client devices 208(1)-208(*n*) via communication network(s) 210. A communication interface of the ARGRCRA device 202, such as the network interface 114 of the computer system 102 of FIG. 1, operatively couples and communicates between the ARGRCRA device 202, the server devices 204(1)-204(*n*), and/or the client devices 208(1)-208(*n*), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ARGRCRA device 202, the server devices 204(1)-204(*n*), and/or the client devices 208(1)-208(*n*) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ARGRCRA devices that efficiently implement a method for using AI techniques to generate actionable recourses for resolving constrained resource allocation problems that would otherwise be infeasible.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ARGRCRA device 202 may be a standalone device or integrated with one or more other devices or apparatuses, such as one or more of the server devices 204(1)-204(*n*), for example. In one particular example, the ARGRCRA device 202 may include or be hosted by one of the server devices 204(1)-204(*n*), and other arrangements are also possible. Moreover, one or more of the devices of the ARGRCRA device 202 may be in a same or a different communication network including one or more public, private, or cloud networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204(*n*) may include, among other features, one or more processors, a memory, and a communication interface, which are coupled together by a bus or other communication link, although other numbers and/or types of network devices may be used. The server devices 204(1)-204(*n*) in this example may process requests received from the ARGRCRA device 202 via the communication network(s) 210 according to the HTTP-based and/or JavaScript Object Notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) hosts the databases 206(1)-206 (*n*) that are configured to store data that relates to various types of resources that are available for allocation and data that relates to constraints and preferences associated with the resources.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204 (1)-204(*n*) may contain a plurality of network computing devices that operate using a master/slave approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. For example, the client devices 208 (1)-208(*n*) in this example may include any type of computing device that can interact with the ARGRCRA device 202 via communication network(s) 210. Accordingly, the client devices 208(1)-208(*n*) may be mobile computing devices, desktop computing devices, virtual computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(*n*) may run interface applications, such as standard web browsers or standalone client applications, which may provide an interface to communicate with the ARGRCRA device 202 via the communication network(s) 210 in order to communicate user requests and information. The client devices 208(1)-208(*n*) may further include, among other features, a display device, such as a display screen or touchscreen, and/or an input device, such as a keyboard, for example.

Although the exemplary network environment 200 with the ARGRCRA device 202, the server devices 204(1)-204 (*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ARGRCRA device 202, the server devices 204(1)-204(*n*), or the client devices 208(1)-208(*n*), for example, may be configured to operate as virtual instances on the same physical machine. In other words, one or more of the ARGRCRA device 202, the server devices 204(1)-204(*n*), or the client devices 208(1)-208(*n*) may operate on the same physical device rather than as separate devices communicating through communication network(s) 210. Additionally, there may be more or fewer ARGRCRA devices 202, server devices 204(1)-204(*n*), or client devices 208(1)-208(*n*) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
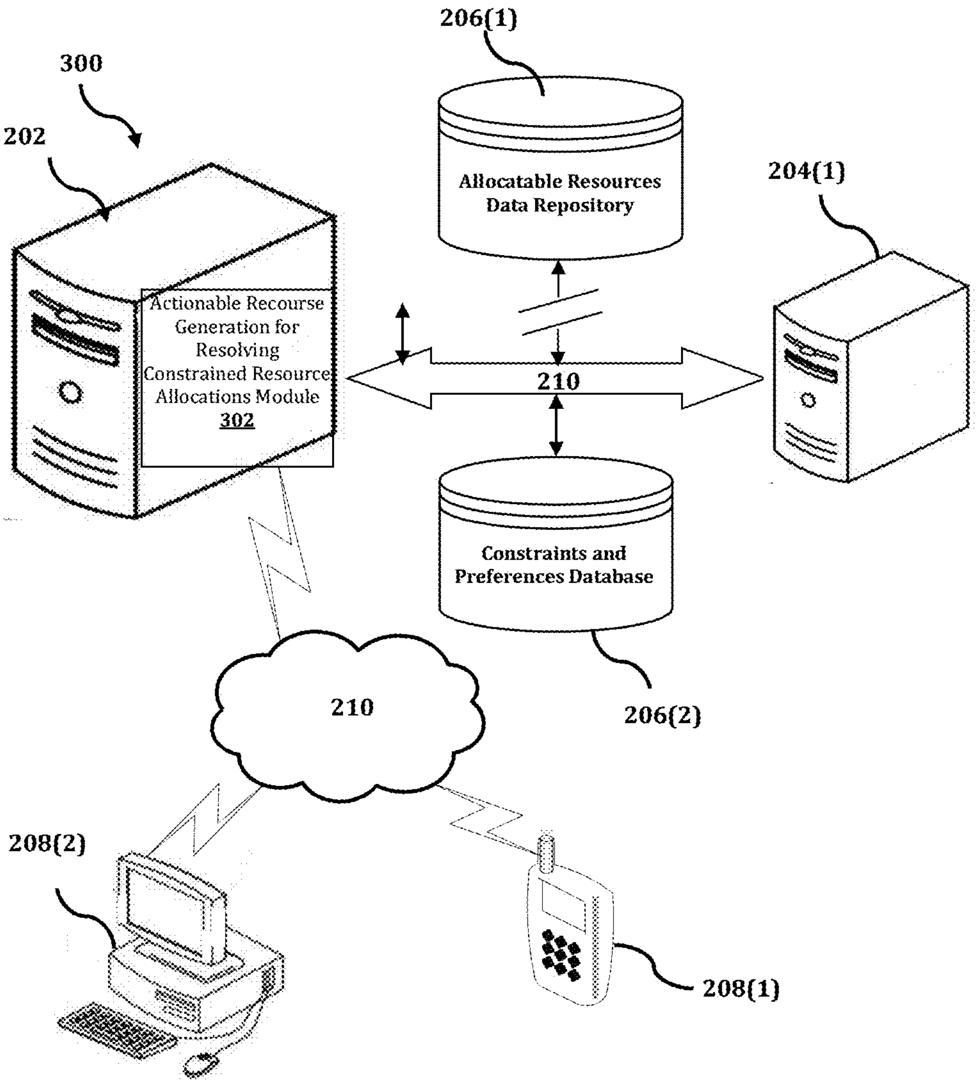
FIG. 3 shows an exemplary system for implementing a method for using artificial intelligence techniques to generate actionable recourses for resolving constrained resource allocation problems that would otherwise be infeasible.

The ARGRCRA device 202 is described and illustrated in FIG. 3 as including an actionable recourse generation for resolving constrained resource allocations module 302, although it may include other rules, policies, modules, databases, or applications, for example. As will be described below, the actionable recourse generation for resolving constrained resource allocations module 302 is configured to implement a method for using AI techniques to generate actionable recourses for resolving constrained resource allocation problems that would otherwise be infeasible.

An exemplary process 300 for implementing a mechanism for using AI techniques to generate actionable recourses for resolving constrained resource allocation problems that would otherwise be infeasible by utilizing the network environment of FIG. 2 is illustrated as being executed in FIG. 3. Specifically, a first client device 208(1) and a second client device 208(2) are illustrated as being in communication with ARGRCRA device 202. In this regard, the first client device 208(1) and the second client device 208(2) may be "clients" of the ARGRCRA device 202 and are described herein as such. Nevertheless, it is to be known and understood that the first client device 208(1) and/or the second client device 208(2) need not necessarily be "clients" of the ARGRCRA device 202, or any entity described in association therewith herein. Any additional or alternative relationship may exist between either or both of the first client device 208(1) and the second client device 208(2) and the ARGRCRA device 202, or no relationship may exist.

Further, ARGRCRA device 202 is illustrated as being able to access an allocatable resources data repository 206(1) and a constraints and preferences database 206(2). The actionable recourse generation for resolving constrained resource allocations module 302 may be configured to access these databases for implementing a method for using AI techniques to generate actionable recourses for resolving constrained resource allocation problems that would otherwise be infeasible.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ARGRCRA device 202 via broadband or cellular communication. Of course, these embodiments are merely exemplary and are not limiting or exhaustive.

Upon being started, the actionable recourse generation for resolving constrained resource allocations module 302 executes a process for using AI techniques to generate actionable recourses for resolving constrained resource allocation problems that would otherwise be infeasible. An exemplary process for using AI techniques to generate actionable recourses for resolving constrained resource allocation problems that would otherwise be infeasible is generally indicated at flowchart 400 in FIG. 4.

Figure 4:
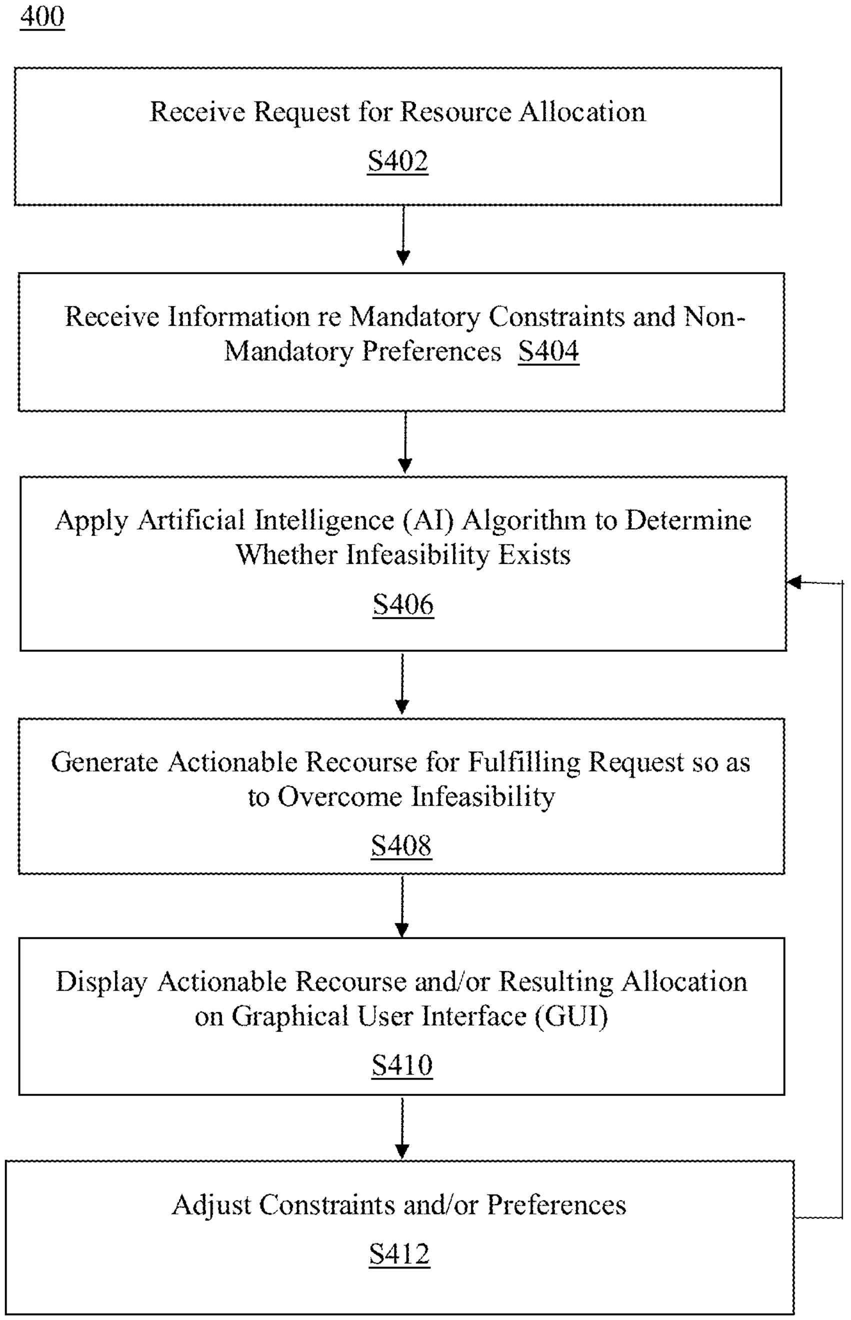
FIG. 4 is a flowchart of an exemplary process for implementing a method for using artificial intelligence techniques to generate actionable recourses for resolving constrained resource allocation problems that would otherwise be infeasible.

In process 400 of FIG. 4, at step S402, the actionable recourse generation for resolving constrained resource allocations module 302 receives a request for a resource allocation that includes first information that relates to at least one resource to be allocated. In an exemplary embodiment, the request may relate to resources associated with a commercial activity, such as, for example, shipping logistics. In another exemplary embodiment, the request may relate to resources associated with real estate utilization, such as, for example, offices and/or desks in a building to be populated by employees of a commercial entity. In yet another exemplary embodiment, the request may relate to labor resources associated with a task, such as, for example, providing medical care at a hospital facility.

At step S404, the actionable recourse generation for resolving constrained resource allocations module 302 receives an input that includes second information that relates to mandatory constraints with respect to the resource allocation request. In an exemplary embodiment, with respect to a request that relates to shipping logistics, the constraints may include requirements that relate to delivery times. In another exemplary embodiment, with respect to a request that relates to real estate utilization, the constraints may include numbers of available desks at particular times. In yet another exemplary embodiment, with respect to a request that relates to a task, the constraints may includes numbers of qualified personnel that are required for adequate staffing at particular times. In an exemplary embodiment, the input may further include third information that relates to one or more preferences that are not mandatory.

At step S406, the actionable recourse generation for resolving constrained resource allocations module 302 determines whether it is feasible to allocate the available resources in a manner that fulfills the request and also satisfies all of the constraints (and possibly preferences) indicated in the input received at step S404, or whether an infeasibility exists. In an exemplary embodiment, a determination that an infeasibility exists is made by applying an artificial intelligence (AI) algorithm that uses at least one mixed-integer optimization technique for identifying at least one constraint and/or at least one preference that is impossible to satisfy in attempting to fulfill the resource allocation request.

In an exemplary embodiment, the determination as to whether an infeasibility exists may entail making a determination of a minimal unsatisfied constraints (MUC) set with respect to the resource allocation request. The MUC may be determined as follows:

$$MUC:$$

$$\min \sum_{i \in I} y_i$$

$$a_i x: \begin{Bmatrix} \le b_i + My_i \text{ if constraint } \le \\ \ge b_i - My_i \text{ if constraint } \ge \\ = b_i + My_i^+ - My_i^- \text{ if constraint } = \end{Bmatrix}$$

In the above expression, $y_i$ is defined as being equal to one (1) if constraint i must be relaxed to make the problem feasible, and it is defined as being equal to zero (0) otherwise.

At step S408, the actionable recourse generation for resolving constrained resource allocations module 302 generates an actionable recourse for facilitating a fulfillment of the resource allocation request in a manner that overcomes the infeasibility. In an exemplary embodiment, the actionable recourse is generated in a two-stage process. First, by using a subject matter expertise (SME) database to translate the unsatisfiable constraints and/or preferences that are identified in step S406 as being impossible to satisfy into possible explanations for infeasibility. Next, the identified explanation along with the unsatisfiable constraints and/or preferences can be translated into an actionable recourse that overcomes the infeasibility.

In an exemplary embodiment, the actionable recourse is presentable as a brief textual message of one or two sentences that is relatively easy to understand. For example, if the resource allocation request entails trying to allocate teams with a total of 400 desks to a floor on which there are 300 seats, the actionable recourse may be as follows: "The problem is infeasible; however, if you let these teams have a 60% ratio, then resolving the problem becomes feasible." As another example, if the resource allocation request entails shipping logistics that have constrained delivery times, the actionable recourse may be as follows: "The problem is infeasible; however, if we can process 10 more items per hour, then resolving the problem becomes feasible." As another example, if the resource allocation request entails scheduling of nurses in a hospital, the actionable recourse may be as follows: "The problem is infeasible; however, if we had 4 more nurses scheduled for the night shift on Tuesdays, then resolving the problem would become feasible."

At step S410, the actionable recourse generation for resolving constrained resource allocations module 302 displays the actionable recourse generated in step S408 via a graphical user interface (GUI). Alternatively, if a determination is made in step S406 that it is feasible to fulfill the resource allocation request in a manner that satisfies all of the constraints (and possibly all of the preferences), then information about such a resource allocation is to be made may be displayed via the GUI.

At step S412, the actionable recourse generation for resolving constrained resource allocations module 302 receives an input by which at least one constraint and/or at least one preference is adjusted. In an exemplary embodiment, the adjustment may include a deletion of at least one preference and may not include any changes to the constraints. In this aspect, any such adjustments to preferences may be favored over adjustments to constraints, in recognition of the non-mandatory nature of the preferences. Then, each of steps S406, S408, and S410 may be repeated based on the adjustment to the specification of constraints and preferences, and thus, a new determination regarding feasibility/infeasibility of fulfilling the resource allocation request and a new, revised actionable recourse that relates to a further determination that an infeasibility exists may be generated.

Accordingly, with this technology, an optimized process for using AI techniques to generate actionable recourses for resolving constrained resource allocation problems that would otherwise be infeasible is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for responding to a request for a resource allocation, the method being implemented by at least one processor, the method comprising:

receiving, by the at least one processor from a user, a request for a resource allocation that includes first information that relates to at least one resource to be allocated;

receiving, by the at least one processor, a first input that includes second information that relates to at least one constraint that is mandatory with respect to the request;

receiving, by the at least one processor, a second input that includes third information that relates to at least one preference that is not mandatory;

determining, by the at least one processor via an artificial intelligence (AI) algorithm, a minimal unsatisfied constraints set with respect to the request, wherein the AI algorithm uses mixed-integer optimization to determine a least number of possible conditions required for satisfying the resource allocation to generate the minimal unsatisfied constraints set and reduce resource requirements, and wherein the mixed-integer optimization further determines whether a respective constraint of the at least one constraint must be altered for the satisfying of the resource allocation, and wherein the generating of the minimal unsatisfied constraints set includes computing a series of conditional expressions for identifying a feasibility for the satisfying of the resource allocation;

identifying, by the at least one processor via the AI algorithm, at least one condition that is impossible to satisfy with respect to the request, based on the minimal unsatisfied constraints set, wherein the at least one condition includes at least one from among the at least one preference and the at least one constraint;

determining, by the at least one processor, that an infeasibility exists with respect to fulfilling the request in a manner that satisfies each of the at least one constraint and the at least one preference, based on the identifying of the at least one condition, wherein the determining that the infeasibility exists includes identifying, via the mixed-integer optimization technique, a constraint from among the at least one constraint that is impossible to satisfy;

generating, by the at least one processor, an actionable recourse for facilitating a fulfillment of the request in a manner that overcomes the infeasibility; and performing, by the at least one processor and based on the generated actionable recourse, an action that facilitates the fulfillment of the request in a manner that overcomes the infeasibility.

2. The method of claim 1, wherein the generating of the actionable recourse comprises using a subject matter expertise (SME) knowledge database to translate the identified constraint into at least one explanation that is usable for generating the actionable recourse.

3. The method of claim 1, further comprising displaying, via a graphical user interface (GUI), a result of the generating of the actionable recourse.

4. The method of claim 1, further comprising:

displaying, via a graphical user interface (GUI), a prompt that facilitates a reception of a third input that includes at least one adjustment to the second information included in at least one from among the first input and the second input;

determining, by the at least one processor based on the third input, whether the infeasibility has been overcome;

when a determination is made that the infeasibility has been overcome, generating a response to the request, and displaying the response via the GUI; and when a determination is made that the infeasibility has not been overcome, generating a revised actionable recourse based on the determination that the infeasibility has not been overcome, and displaying the revised actionable recourse via the GUI.

5. The method of claim 1, wherein the request for the resource allocation relates to resources associated with shipping logistics, and the at least one constraint includes at least one requirement that relates to a delivery time.

6. The method of claim 1, wherein the request for the resource allocation relates to resources associated with real estate utilization, and the at least one constraint includes at least one number of available desks at a particular time.

7. The method of claim 1, wherein the request for the resource allocation relates to labor resources associated with a task, and the at least one constraint includes at least one number of qualified personnel that are required for staffing with respect to the task at a particular time.

8. A computing apparatus for responding to a request for a resource allocation, the computing apparatus comprising:

a processor;

a memory;

a display; and a communication interface coupled to each of the processor, the memory, and the display, wherein the processor is configured to:

receive, from a user via the communication interface, a request for a resource allocation that includes first information that relates to at least one resource to be allocated;

receive, via the communication interface, a second input that includes second information that relates to at least one constraint that is mandatory with respect to the request;

receive a second input that includes third information that relates to at least one preference that is not mandatory;

determine, via an artificial intelligence (AI) algorithm, a minimal unsatisfied constraints set with respect to the request, wherein the AI algorithm uses mixed-integer optimization to determine a least number of possible conditions required for satisfying the resource allocation to generate the minimal unsatisfied constraints set and reduce resource requirements, and wherein the mixed-integer optimization further determines whether a respective constraint of the at least one constraint must be altered for the satisfying of the resource allocation, and wherein the generating of the minimal unsatisfied constraints set includes computing a series of conditional expressions for identifying a feasibility for the satisfying of the resource allocation;

identify, via the AI algorithm, at least one condition that is impossible to satisfy with respect to the request, based on the minimal unsatisfied constraints set, wherein the at least one condition includes at least one from among the at least one preference and the at least one constraint;

determine that an infeasibility exists with respect to fulfilling the request in a manner that satisfies each of the at least one constraint and the at least one preference, based on the identified at least one condition, wherein the determining that the infeasibility exists includes identifying, via the mixed-integer optimization technique, a constraint from among the at least one constraint that is impossible to satisfy;

generate an actionable recourse for facilitating a fulfillment of the request in a manner that overcomes the infeasibility; and perform, based on the generated actionable recourse, an action that facilitates the fulfillment of the request in a manner that overcomes the infeasibility.

9. The computing apparatus of claim 8, wherein the processor is further configured to generate the actionable recourse by using a subject matter expertise (SME) knowledge database to translate the identified constraint into at least one explanation that is usable for generating the actionable recourse.

10. The computing apparatus of claim 8, wherein the processor is further configured to cause the display to display a result of the generation of the actionable recourse via a graphical user interface (GUI).

11. The computing apparatus of claim 8, wherein the processor is further configured to:

cause the display to display, via a graphical user interface (GUI), a prompt that facilitates a reception of a third input that includes at least one adjustment to the second information included in at least one from among the first input and the second input;

determine, based on the third input, whether the infeasibility has been overcome;

when a determination is made that the infeasibility has been overcome, generate a response to the request, and cause the display to display the response via the GUI; and when a determination is made that the infeasibility has not been overcome, generate a revised actionable recourse based on the determination that the infeasibility has not been overcome, and cause the display to display the revised actionable recourse via the GUI.

12. The computing apparatus of claim 8, wherein the request for the resource allocation relates to resources associated with shipping logistics, and the at least one constraint includes at least one requirement that relates to a delivery time.

13. The computing apparatus of claim 8, wherein the request for the resource allocation relates to resources associated with real estate utilization, and the at least one constraint includes at least one number of available desks at a particular time.

14. The computing apparatus of claim 8, wherein the request for the resource allocation relates to labor resources associated with a task, and the at least one constraint includes at least one number of qualified personnel that are required for staffing with respect to the task at a particular time.

15. A non-transitory computer readable storage medium storing instructions for responding to a request for a resource allocation, the storage medium comprising executable code which, when executed by a processor, causes the processor to:

receive, from a user, a request for a resource allocation that includes first information that relates to at least one resource to be allocated;

receive a first input that includes second information that relates to at least one constraint that is mandatory with respect to the request;

receive a second input that includes third information that relates to at least one preference that is not mandatory;

determine, via an artificial intelligence (AI) algorithm, a minimal unsatisfied constraints set with respect to the request, wherein the AI algorithm uses mixed-integer optimization to determine a least number of possible conditions required for satisfying the resource allocation to generate the minimal unsatisfied constraints set and reduce resource requirements, and wherein the mixed-integer optimization further determines whether a respective constraint of the at least one constraint must be altered for the satisfying of the resource allocation, and wherein the generating of the minimal unsatisfied constraints set includes computing a series of conditional expressions for identifying a feasibility for the satisfying of the resource allocation;

identify, via the AI algorithm, at least one condition that is impossible to satisfy with respect to the request, based on the minimal unsatisfied constraints set, wherein the at least one condition includes at least one from among the at least one preference and the at least one constraint;

determine that an infeasibility exists with respect to fulfilling the request in a manner that satisfies each of the at least one constraint and the at least one preference, based on the identified at least one condition, wherein the determining that the infeasibility exists includes identifying, via the mixed-integer optimization technique, a constraint from among the at least one constraint that is impossible to satisfy;

generate an actionable recourse for facilitating a fulfillment of the request in a manner that overcomes the infeasibility; and perform, based on the generated actionable recourse, an action that facilitates the fulfillment of the request in a manner that overcomes the infeasibility.

* * * * *